(12) United States Patent
Tonetti et al.

(10) Patent No.: US 11,170,770 B2
(45) Date of Patent: Nov. 9, 2021

(54) DYNAMIC ADJUSTMENT OF RESPONSE THRESHOLDS IN A DIALOGUE SYSTEM

(71) Applicant: International Business Machines Corporation, Armonk, NY (US)

(72) Inventors: Alexander C. Tonetti, Washington, DC (US); Edward G. Katz, Washington, DC (US); Allen Ginsberg, St. Petersburg, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/054,704

(22) Filed: Aug. 3, 2018

(65) Prior Publication Data

US 2020/0043485 A1    Feb. 6, 2020

(51) Int. Cl.
| | |
|---|---|
| *G06F 17/00* | (2019.01) |
| *G10L 15/22* | (2006.01) |
| *G10L 15/08* | (2006.01) |
| *G06N 5/04* | (2006.01) |
| *G10L 15/01* | (2013.01) |
| *G06F 40/30* | (2020.01) |

(52) U.S. Cl.
CPC .............. *G10L 15/22* (2013.01); *G06N 5/04* (2013.01); *G10L 15/01* (2013.01); *G10L 15/08* (2013.01); *G06F 40/30* (2020.01); *G10L 2015/225* (2013.01)

(58) Field of Classification Search
CPC ..... G10L 15/08; G10L 15/01; G10L 15/1822; G10L 15/22; G10L 2015/225; G06N 5/04; G06F 40/30

USPC ........................................................ 704/200
See application file for complete search history.

(56) References Cited

U.S. PATENT DOCUMENTS

| | | | | |
|---|---|---|---|---|
| 6,941,266 | B1 * | 9/2005 | Gorin | G10L 15/22 704/257 |
| 7,440,893 | B1 * | 10/2008 | Gorin | G10L 15/22 704/240 |
| 7,606,714 | B2 * | 10/2009 | Williams | G10L 13/027 704/275 |
| 8,639,508 | B2 * | 1/2014 | Zhao | G10L 15/08 379/88.01 |
| 8,886,532 | B2 * | 11/2014 | Levit | G10L 15/08 704/231 |
| 9,037,462 | B2 | 5/2015 | Williams | |
| 9,472,185 | B1 | 10/2016 | Yeracaris et al. | |
| 9,558,740 | B1 * | 1/2017 | Mairesse | G10L 15/08 |
| 9,679,568 | B1 * | 6/2017 | Taubman | G10L 15/22 |
| 2003/0216919 | A1 * | 11/2003 | Roushar | G06F 17/277 704/260 |

(Continued)

*Primary Examiner* — Paul C McCord
(74) *Attorney, Agent, or Firm* — Patterson + Sheridan, LLP

(57) ABSTRACT

Method and apparatus improves the quality of responses from an automatic dialogue system by dynamically adjusting response thresholds. More particularly, the automatic dialogue system may dynamically determine response threshold values in response to user feedback. The response threshold values may be used to evaluate a confidence value. The confidence value may be assigned to or otherwise associated with an input class, or user intent. The system may automatically adjust the response threshold values to provide a better user experience as the amount of user-interaction with the system increases.

19 Claims, 6 Drawing Sheets

(56) References Cited

U.S. PATENT DOCUMENTS

| | | | |
|---|---|---|---|
| 2004/0148170 A1* | 7/2004 | Acero | G06F 40/216 704/257 |
| 2005/0080613 A1* | 4/2005 | Colledge | G06F 16/951 704/9 |
| 2006/0149544 A1* | 7/2006 | Hakkani-Tur | G10L 15/22 704/236 |
| 2006/0200347 A1* | 9/2006 | Kim | G10L 15/22 704/236 |
| 2006/0293886 A1* | 12/2006 | Odell | G10L 15/08 704/231 |
| 2007/0083366 A1* | 4/2007 | Peters | G10L 15/26 704/235 |
| 2009/0259455 A1* | 10/2009 | Becker | G06Q 10/06 703/22 |
| 2012/0173464 A1* | 7/2012 | Tur | G06N 5/022 706/11 |
| 2013/0073487 A1* | 3/2013 | Reisman | G06F 16/00 706/12 |
| 2013/0138439 A1* | 5/2013 | Marcus | G10L 15/22 704/240 |
| 2014/0278391 A1* | 9/2014 | Braho | G10L 25/78 704/233 |
| 2014/0350941 A1* | 11/2014 | Zeigler | G06F 3/167 704/275 |
| 2015/0142704 A1* | 5/2015 | London | G06F 40/58 706/11 |
| 2015/0178270 A1* | 6/2015 | Zuev | G06F 40/30 704/9 |
| 2016/0117360 A1* | 4/2016 | Kune | G06F 16/24573 707/730 |
| 2016/0225370 A1* | 8/2016 | Kannan | G10L 15/22 |
| 2016/0352240 A1 | 12/2016 | Kristensen | |
| 2017/0004831 A1* | 1/2017 | White | G06F 3/0236 |
| 2018/0090136 A1* | 3/2018 | Connell, II | G06F 17/27 |
| 2018/0268809 A1* | 9/2018 | Fujimura | G10L 15/08 |
| 2018/0336896 A1* | 11/2018 | McGann | G06N 5/003 |

\* cited by examiner

DYNAMIC ADJUSTMENT OF RESPONSE THRESHOLDS IN A DIALOGUE SYSTEM

BACKGROUND

The present invention relates to computing systems, and more specifically, to automatic dialogue systems.

An automatic dialogue system uses a statistical classifier to identify an input class, or user intent. User intents are purposes or goals expressed by a user, such as a request to answer a question, or to process a bill payment. Within a spoken language automatic dialogue system, user intents are communicated in an utterance. In one implementation, the speech is recognized using an automatic speech recognizer (ASR). The intent of the speaker is identified from the recognized utterance using a spoken language understanding (SLU) component. The spoken language automatic dialogue system is thus enabled to take actions according to the identified user intent.

This classification of the user intent can be associated with a given level of confidence. For instance, a high confidence rating can be linked to user intent when the automatic dialogue system determines with a high degree of certainty that the user intent has been correctly classified. A high confidence system enables a direct, immediate response to the user intent. In contrast, a lower confidence rating may query the user for additional information before being able to respond directly to the user intent. Ideally, response thresholds associated with different confidence levels are set such that clarification questions are asked infrequently, and incorrect responses (e.g., misclassified user intent) are even less frequent.

SUMMARY

According to one particular embodiment, a method of improving a quality of responses from an automatic dialogue system by dynamically adjusting response thresholds includes receiving a user intent, associating a confidence ranking with a user intent, and evaluating the confidence ranking against a first response threshold. The method further includes outputting a result to a user, receiving user input in response to the result, and determining from the user input an inference relating to the accuracy of the response. The first response threshold may be dynamically adjusted based on the inference.

According to another particular embodiment, an apparatus includes an interface to receive a user intent and to output a result to a user, and a classifier module to associate a confidence ranking with a user intent. A threshold evaluation module may compare the confidence ranking against a first response threshold, and an inference module may receive user input in response to the result, where the inference module is further configured to determine from the user input an inference relating to the accuracy of the response. A threshold modification module may dynamically adjust the first response threshold based on the inference.

According to another particular embodiment, a program product includes program product to improve a quality of responses from an automatic dialogue system by dynamically adjusting response thresholds, the program product comprising a computer readable storage medium having computer readable program code embodied therewith, the computer readable program code executable by a processor to access the memory and to execute the program code to receive a user intent, to associate a confidence ranking with a user intent, to evaluate the confidence ranking against a first response threshold, to output a result to a user, to receive user input in response to the result, to determine from the user input an inference relating to the accuracy of the response, and to dynamically adjust the first response threshold based on the inference.

DETAILED DESCRIPTION

Figure 1:
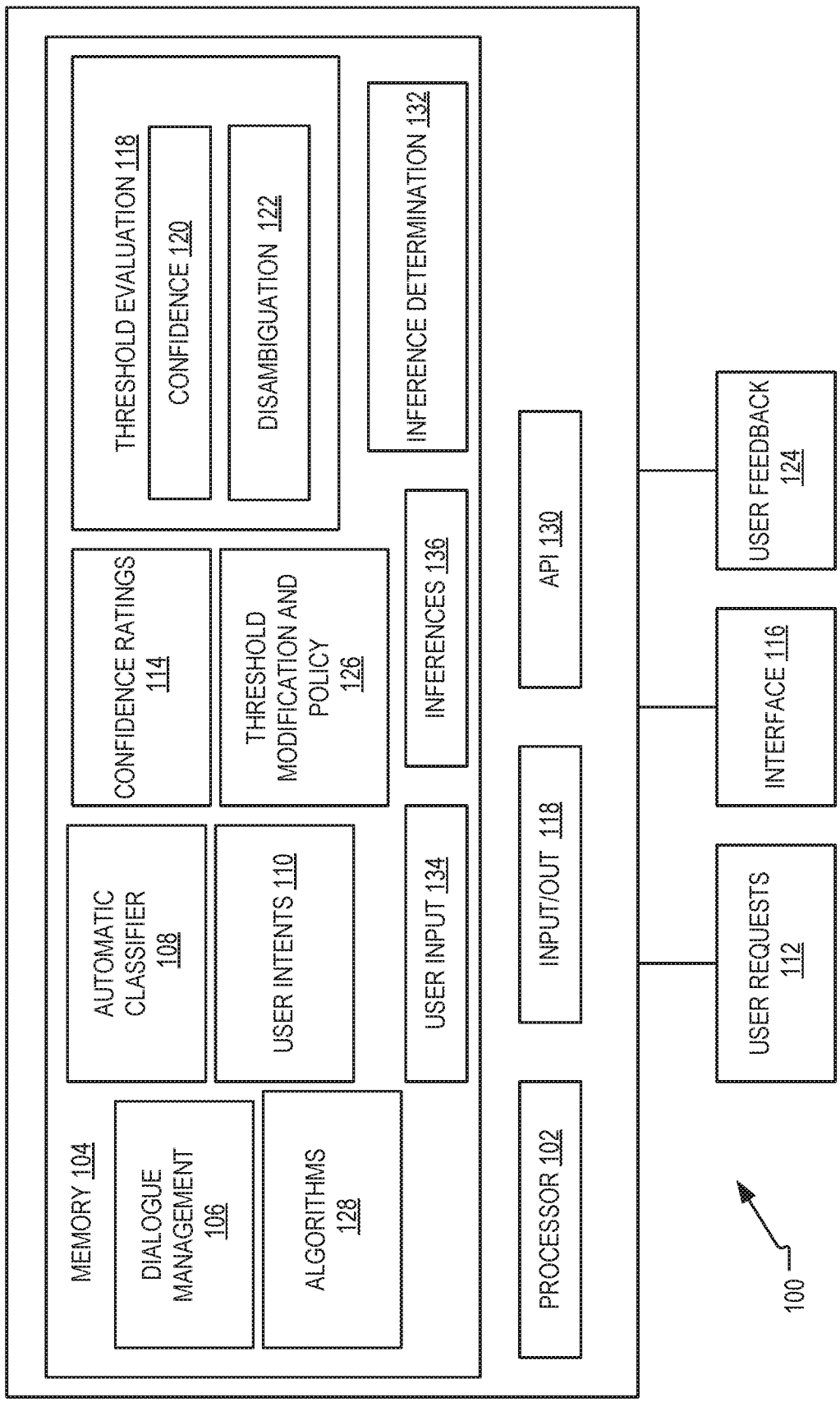
FIG. 1 is a block diagram of an embodiment of a system to improve responses from an automatic dialogue system by dynamically adjusting response thresholds in response to user feedback and confidence level analysis.

An embodiment of a method improves the quality of responses from an automatic dialogue system by dynamically adjusting response thresholds. More particularly, the automatic dialogue system may dynamically determine response threshold values in response to user feedback. The response threshold values may be used to evaluate a confidence value. The confidence value may be assigned to or otherwise associated with an input class, or user intent. As discussed herein, user intent may include a requested goal of a system user. According to a particular implementation, the system may automatically adjust the response threshold values to provide a better user experience as the amount of user-interaction with the system increases.

In the context of a classifier-based dialogue manager, each user input may be associated with an inferred dialogue move, or user intent, by making use of a text classification system. Unseen input may be classified among potential known classes of user intent with a confidence value. The confidence value may be returned by the classifier. Because this process may include statistical inference, the classification may be wrong. In some implementations, a system of response thresholds is used to determine dialogue system behavior. If the classifier's confidence value is above a confidence threshold, the system may return a response appropriate to the inferred user intent. If the confidence value is below this confidence threshold, but still above a disambiguation threshold, then the system may ask the user for confirmation that the system has drawn the correct inference.

While embodiments of the system have application in training data scenarios, a particular implementation may be an analytical task (e.g., setting the response threshold to maximize a figure of merit, such as an F1 score). Unlike classifiers that are trained with simulated or hypothetical user input, a particular embodiment may adjust the response thresholds dynamically in response to actual user input. Put another way, the embodiment of the system may dynamically set response threshold values used to evaluate the confidence levels in response to real-time, inferred assessments from user input (e.g., a dynamic confidence threshold determination).

In one embodiment of the system, confidence levels may be automatically adjusted to avoid repeating that unsuccessful interactions with future users. In this manner, the system may modify the chat flow decision engine, rather than route problems to programmers.

An illustrative implementation may include an automatic classifier used to classify user inputs. More particularly, the automatic classifier may return a class label and a confidence level for any user input. A dialogue management system may determine an appropriate user response for a given input class. A confidence threshold may be determined for the dialogue management system. A disambiguation threshold may be set below the confidence threshold for the system, and a threshold modification policy may be programmed.

An embodiment of the system may accept input from user via an interface. The user input may be passed to an automatic classifier. The automatic classifier may return a ranking of at least one class label and an associated confidence level. If the confidence level is above a confidence threshold, the system may display to the user a response from the dialogue manager. The response, in such an instance, may be the discovered class label.

After reviewing the response, the user may decide the discovered class label is wrong. The system may subsequently receive implicit or explicit user feedback that the response indicates a misclassification of the input. In response, the system may increase the confidence threshold according to the threshold modification policy. The system may further increase the disambiguation threshold in response to the user feedback.

Should the confidence level alternatively be below the confidence threshold, the system may determine if the confidence level is above a disambiguation threshold. If the confidence level is alternatively above the disambiguation threshold, the system may prompt the user to confirm that the determined class label is correct. For example, the system may use an interface to display to the user the discovered class label. If the confirmation is affirmative, the confidence threshold may decreased, and potentially, the disambiguation threshold. The decreases to the confidence and disambiguation thresholds may be determined in accordance with the threshold modification policy. If the confirmation is alternatively negative, the system may increase the disambiguation threshold (e.g., according to the threshold modification policy) and ask the user for a new input.

If the confidence level is alternatively below the disambiguation threshold (and the confidence threshold), the system may prompt the user for a new input. The system may prompt the user to make a response and may increase the disambiguation threshold (and possibly the confidence threshold).

An embodiment of the method may use the explicit or implicit responses of the user to the various outputs to adjust the system of response thresholds. When a user indicates (e.g., through the user feedback system or other mechanism) that a response from the dialogue is incorrect, the confidence threshold may be increased. Alternatively, when a user indicates that the dialogue system has chosen the correct topic in the disambiguation question, the confidence threshold may be decreased. Likewise, the disambiguation threshold may be decreased.

A threshold modification policy may indicate how each response threshold may be modified upwards or downwards based on the given response threshold. Such modifications may also be affected by other circumstances, such as the number of adjustments already made. The threshold modification policy may involve adjustment with a fixed increment, or may involve a diminishing increment.

In one example of a threshold modification policy with a diminishing increment, the response threshold may be adjusted upwards or downwards by a weighted difference between a response threshold and the confidence score. The weighting may be based on the proportion of incorrectly classified inputs to total user inputs. As such, a response threshold may be adjusted more if the confidence score is further from the response threshold. Additionally, the response threshold may adjust less if the system of response thresholds is resulting in mostly correctly classified inputs. In formulaic terms, such a response threshold modification policy may be expressed as:

$$threshold_{new} = threshold_{old} + \left(\frac{\text{\# of confidence level adjustments}}{\text{total \# of classifications made}}\right)(\text{confidence level} - threshold_{old})$$

for the upward adjustment formula, and for the downward adjustment, this illustrative formula may be used:

$$threshold_{new} = threshold_{old} - \left(\frac{\text{\# of confidence level adjustments}}{\text{total \# of classifications made}}\right)(threshold_{old} - \text{confidence level})$$

In an embodiment with such a threshold modification policy, the beginning changes to the response threshold may be the most significant. As time goes on, the changes may be much smaller, similar to how an alternating harmonic series approaches zero.

One illustrative threshold modification policy may include increases by 10% and reductions by 10%. Additionally, the threshold modification policy may cause the system to maintain at least a 0.5 difference between a confidence threshold and a disambiguation threshold.

In a first example with such a threshold modification policy, a chat flow may produce changes to neither the confidence threshold nor the disambiguation threshold. The system may start out with a confidence threshold of 0.85 and a disambiguation threshold of 0.25.

At the onset of the chat flow, a user may enter the statement into a user interface, "What is my current bill account?" An automatic classification system, or auto classifier, may return a class label (e.g., user intent) of "GET_BILL_AMOUNT." The auto classifier may also generate a confidence level of 0.95 based on that statement. Since the confidence level (i.e., 0.95) associated with "What is my current bill account?" (and with GET_BILL_AMOUNT") is above the confidence threshold (i.e., 0.85), the dialogue management system may return the statement "Your account balance is $50" to the user. The user may then reply with "Thank you," indicating a good response. Because the user indicates a good response, no modifications may be made to response threshold levels.

In a second example, the chat flow may produce an increase in both the confidence threshold and the disambiguation threshold. More particularly, the system may start out with a confidence threshold of 0.85 and a disambiguation threshold of 0.25. The user may enter the statement, "What is my current bill account?" As above, the automatic classification system may return a class label of "GET_BILL_AMOUNT," and a confidence level of 0.90 based on that statement. Since the confidence level of "What is my current bill account?" (i.e., 0.90) is above the confidence threshold (0.85), the dialogue management system may return the statement "Your account is due on June 12th" to the user.

In one instance, the user may then reply with "Excuse me?", indicating a bad response. Because the user indicated a bad response, a 10% increase may be added to both the confidence and disambiguation thresholds, while still maintaining the 0.5 difference between the response thresholds. As a result, the confidence and disambiguation thresholds are 0.935 and 0.385 respectively. By modifying the confidence level, future exchanges may not result in the dialogue manager returning the same response because the confidence level, 0.90, is now below the new confidence threshold, 0.935.

In a third example, the chat flow may produce a decrease in both the confidence threshold and the disambiguation threshold. The system may start out with a confidence threshold of 0.85 and a disambiguation threshold of 0.25. The user may enter the statement, "What is the date on my current bill account?" into the user interface. The automatic classification system may return a class label of "GET_BILL_DATE." The automatic classification system automatic classification system may assign a confidence level of 0.80 based on that statement. Since the confidence level associated with "What is the date on my current bill account?" (i.e., 0.80) is below the confidence threshold (i.e., 0.85), but is above the disambiguation threshold (i.e., 0.25), the dialogue management system may return the question "Are you asking about your billing date?" to the user.

The user may then reply with "Yes," indicating a good response. Because the user indicated a good response, a 10% decrease may be added to both the confidence and disambiguation thresholds, while still maintaining the 0.5 delta between the response thresholds. As a result, the confidence and disambiguation (e.g., first and second thresholds) may be 0.765 and 0.215, respectively. By modifying the confidence level, future exchanges may not result in the dialogue manager returning the same response because the confidence level, 0.80, is now above the new confidence threshold, 0.765.

In another example, the chat flow may produce no change in the confidence threshold, but may produce an increase to the disambiguation threshold. More particularly, the system may start out with a confidence threshold of 0.85 and a disambiguation threshold of 0.25. The user may enter the statement, "What is the balance due on my current bill account?" into the user interface. The automatic classification system may return a class label of "GET_BILL_DATE", with a confidence level of 0.35 based on that statement. Since the confidence level of "What is the balance due on my current bill account?" (i.e., 0.35) is below the confidence threshold (i.e., 0.85), but above the disambiguation threshold (i.e., 0.25), the dialogue management system may return the question, "Are you asking about your billing date?" to the user. The user may then reply, "No," indicating a bad response.

Because the user indicated a bad response, a 10% increase may be added to the disambiguation threshold, and the confidence level may remain constant while still maintaining the 0.5 delta between the response thresholds. As a result, the confidence and disambiguation thresholds are 0.85 and 0.385, respectively. By modifying the confidence level, future exchanges may not result in the dialogue management system, or dialog manager, returning the same response. The response will differ because the confidence level (i.e., 0.35) is now below the new disambiguation threshold (i.e., 0.385).

In another example, the chat flow may produce no changes to either the confidence threshold or the disambiguation threshold. The system may start out with a confidence threshold of 0.85 and a disambiguation threshold of 0.25. The user may enter the statement, "Where is my bill?" into the user interface. The automatic classification system may return a class label of "GET_BILL_AMOUNT," and a confidence level of 0.15 based on that statement. Since the confidence level of "Where is my bill?" (i.e., 0.15) is below the confidence threshold (i.e., 0.85) and below the disambiguation threshold (i.e., 0.25), the dialogue management system may return the statement "I'm sorry I don't understand. Please rephrase." to the user. Because the system could not properly classify the input text based on the current configuration of the response thresholds, no modifications may be made to the response threshold levels.

As shown in the above examples, user feedback may be collected explicitly through a feedback interaction with a user interface (e.g. a good response or bad response buttons). User feedback may alternatively be inferred from the subsequent user input. For example, the system may learn from user actions disregarding results or repeating a dialogue operation to get different results.

In one example, a system includes multiple response thresholds. Each response threshold may correspond to an individual class, or intent. In another implementation, a system includes an overall confidence and disambiguation response threshold for all user intents.

Turning now to the Drawings, FIG. 1 is a block diagram of an embodiment of an apparatus, or system 100, which improves responses from an automatic dialogue system by dynamically adjusting response thresholds based on user feedback. The illustrative system 100 includes a processor 102 and a memory 104. As represented in the block diagram, the memory includes a dialogue management module, or system 106, and an automatic classification module, or system 108.

The dialogue management system 106 may determine an appropriate user response for a given input class, or user intent 110. As discussed herein, user intent 110 may include a requested goal of a system user. The user intent may be provided by the automatic classification system 108 in response to a request 112 or other user input 134. The automatic classification system 108 may additionally return a confidence level, or rating 114, associated with the user request 112 and user intent 110.

In one example, a user request 112 may be typed or spoken into a user interface 116. As such, a user interface 116 may include a keyboard, microphone, speaker, monitor, and optical reader (e.g., to recognize gestures), among other known modes of communication. As such, inferences 136 pertaining to the accuracy of a result, as determined by an interference determination module 132, may be gleaned passively from implicit user input (user tone, context, gestures, etc.), or may be received via express input (typed or spoken affirmations or other responses), or both. The interface may communicate with the processor 102 via an input/output (I/O) module 118. The user request may type or utter, "What helps an upset stomach?" The automatic classification system 108 may return a user intent 110 of "GET_STOMACH_SYMPTOM" with a confidence rating 114 of 0.41 based on that statement.

The confidence rating 114, or level, may be compared to response thresholds 118. For instance, a confidence threshold 120 may be a highest level threshold. Continuing with the above example, the confidence threshold 120 may be 0.45. A lower level response threshold 118 may include a disambiguation threshold 122. The disambiguation threshold 122 may be set to a lower number, such as 0.35. While the response thresholds may be initially set at particular numbers, they may be dynamically adjusted in response to an inference gleaned from stored user input 134 or feedback 124. The dynamic adjustment may also be determined according to automatic analysis against the response thresholds 118, according to a programmed threshold modification policy 126. The threshold modification policy 126 may be programmed to dictate the manner in which each response threshold 118 may be modified upwards or downwards based user input 134 or other analysis, such as by the number of adjustments already made.

Figure 2:
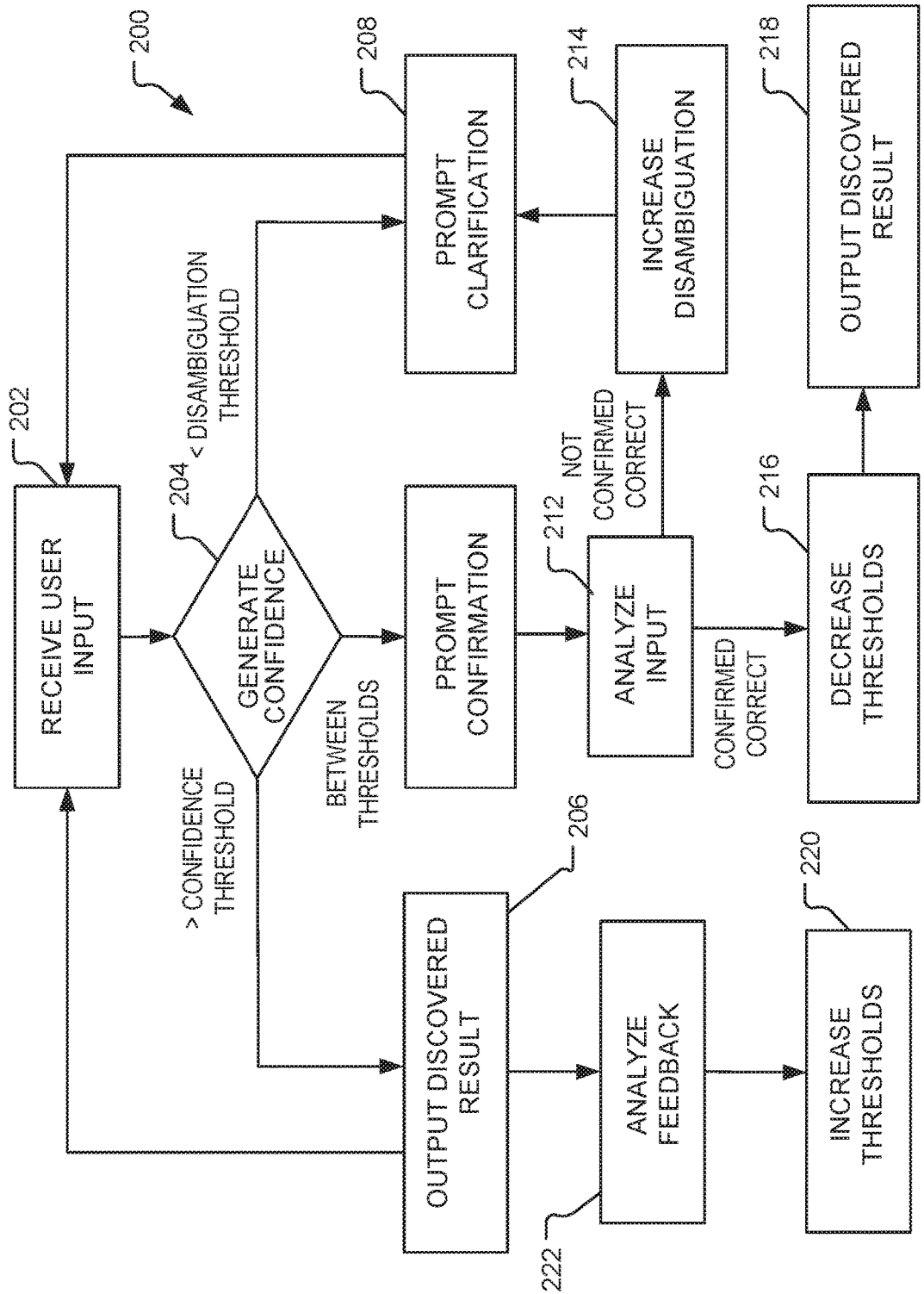
FIG. 2 is an embodiment of a method to improve responses from an automatic dialogue system by dynamically adjusting response thresholds in response to user feedback and confidence level analysis.

FIG. 2 is an embodiment of a method 200 to improve responses from an automatic dialogue system by dynamically adjusting response thresholds in response to user feedback and confidence level analysis. At 202, the system may receive user input. For instance, the system 100 of FIG. 1 may receive a typed or uttered request, "Please provide weather forecasts for the week."

In response at 204, the system may generate a user intent based on the request and assign a confidence level, or ranking. Continuing with the above example, the automatic classification system 108 of FIG. 1 may return a user intent 110 of "GET_WEATHER_REGION" with a confidence rating 114 of 0.23 based on determined intent 110.

If the assigned confidence ranking is greater than a preset confidence threshold at 204, the system may communicate the discovered result at 206 and ready itself to receive a next task at 202. In parallel, the system at 220 may receive and analyze inferred or explicit feedback from the user regarding the sufficiency of the discovered result. Should the feedback be positive at 220, the system may increase the disambiguation threshold and the confidence threshold at 222. If the assigned confidence ranking is alternatively less than the preset confidence threshold at 204, the system may prompt at 208 the user for more clarification, and try again with the new search criteria at 202.

Should the assigned confidence ranking alternatively be less than the preset confidence threshold at 204, but more than the disambiguation threshold, the system may prompt the user at 210 to confirm the request. Based on the user feedback at 212, the system may adjust the response thresholds. More particularly, an absence of confirmation at 210 may case the system to increase the disambiguation threshold at 214 and prompt more clarification at 208.

If the user feedback and analysis at 212 instead confirms the discovered response, the system may decrease at 216 one or both of the confidence and disambiguation threshold values, and may output the discovered result at 218.

Figure 3:
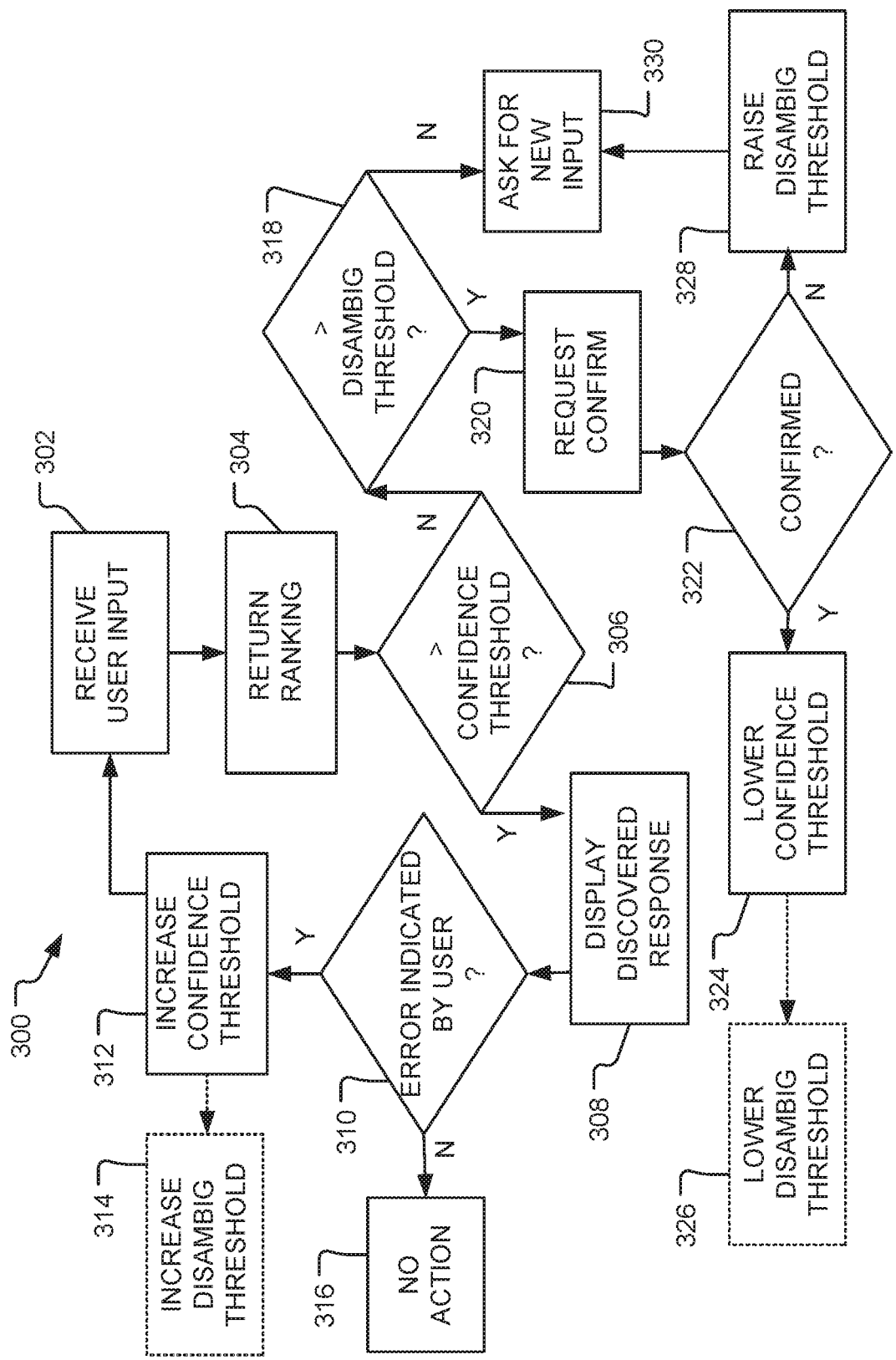
FIG. 3 is yet another embodiment of a method to improve responses from an automatic dialogue system by dynamically adjusting response thresholds in response to user feedback and confidence level analysis.

FIG. 3 is another embodiment of a method 300 to improve responses from an automatic dialogue system by dynamically adjusting response thresholds in response to user feedback. At 302, the system may receive user input in the form of a request. For example, the system 100 of FIG. 1 may receive a typed or uttered request, "Please provide a status on my stocks."

In response, the system may assign at 304 a confidence ranking, or level. Continuing with the above example, the automatic classification system 108 of FIG. 1 may return a user intent 110 of "GET_STOCK_DATES" with a confidence rating 114 of 0.23 based on determined intent 110. That is, the automatic classifier may return a ranking of at least one class label and an associated confidence level. As explained herein, if the confidence level is above a confidence threshold, the system may display to the user a response from the dialogue manager. The response, in such an instance, may be the discovered class label.

More particularly, the system at 306 may evaluate whether the confidence rating assigned at 304 is greater than a confidence threshold. The confidence threshold may be preset, but may be adjustable, as discussed herein. If the confidence ranking is greater than the confidence threshold at 306, then the discovered response may be presented at 308 to the user.

If the user indicates that the discovered response is not a best answer at 310, then the system may increase the confidence threshold at 312. Optionally (e.g., according to the threshold adjustment policy), the disambiguation threshold may be increased, as well, at 314.

After reviewing the response, the user may decide the discovered class label is wrong. The system may subsequently receive implicit or explicit user feedback that the response indicates a misclassification of the input. In response, the system may increase the confidence threshold according to the threshold modification policy. The system may further increase the disambiguation threshold in response to the user feedback.

Should the confidence level alternatively be below the confidence threshold at 306, the system may determine at 318 if the confidence level is above a disambiguation threshold. If the confidence level is above the disambiguation threshold at 318, the system may prompt the user to confirm at 320 that the determined class label is correct. For example, the system may use an interface to display to the user the discovered class label. If the confirmation is affirmed at 322, the confidence threshold may be decreased at 324, and potentially, the disambiguation threshold may be decreased at 326. The decreases to the confidence and disambiguation thresholds may be determined in accordance with the threshold modification policy.

If the confirmation at 322 is alternatively negative, the system may increase the disambiguation threshold at 328 (e.g., according to the threshold modification policy) and ask the user for a new input at 330.

If the confidence level is alternatively below the disambiguation threshold at 318 (and the confidence threshold), the system may prompt the user for a new input at 330. Though not shown, another embodiment of a method may increase the disambiguation threshold, and possibly, the confidence threshold.

Figure 4:
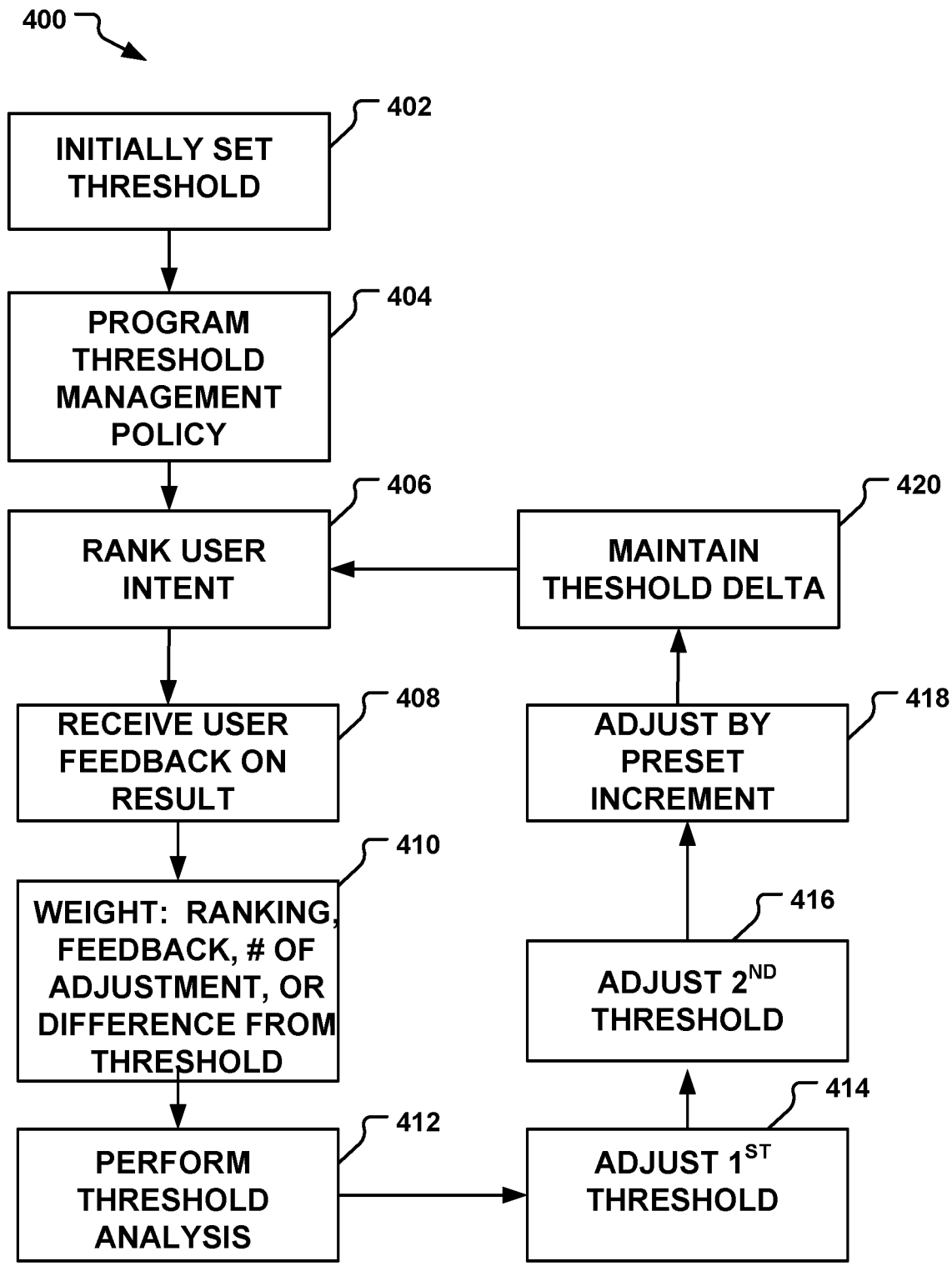
FIG. 4 is yet another embodiment of a method to improve responses from an automatic dialogue system by dynamically adjusting response thresholds in response to user feedback and confidence level analysis.

FIG. 4 is another embodiment of a method 400 executable by the system 100 of FIG. 1 to improve responses from an automatic dialogue system by dynamically adjusting response thresholds in response to user feedback and confidence level analysis. Turning more particularly to the flowchart, the method 400 may preset response thresholds of a system at 401. Parameters of a program threshold management policy may be set at 404.

At 406, a user intent may be assigned a confidence ranking, or level. A response discovered using the user intent may be communicated to a user. The user may provide feedback on the acceptability of the response at 408.

Prior to or as part of performing threshold analysis at 412, the method 400 may weight at 410 at least one of the confidence ranking, the user feedback, a number of previous adjustments to a response threshold, and a difference between the confidence ranking and a response threshold. The threshold analysis at 412 may include evaluating the confidence ranking against one or more response thresholds, as well as executing algorithms to improve responses from an automatic dialogue system by dynamically adjusting the response threshold(s) in response to the user feedback.

First and second response thresholds may be increased or decreased at 414 and 416. The adjustments may be made by a preset increment and may maintain a substantially consistent numerical difference between respective response thresholds, as reflected at 418 and 420. As discussed herein, such parameters may be determined according to the response threshold management policy.

Figure 5:
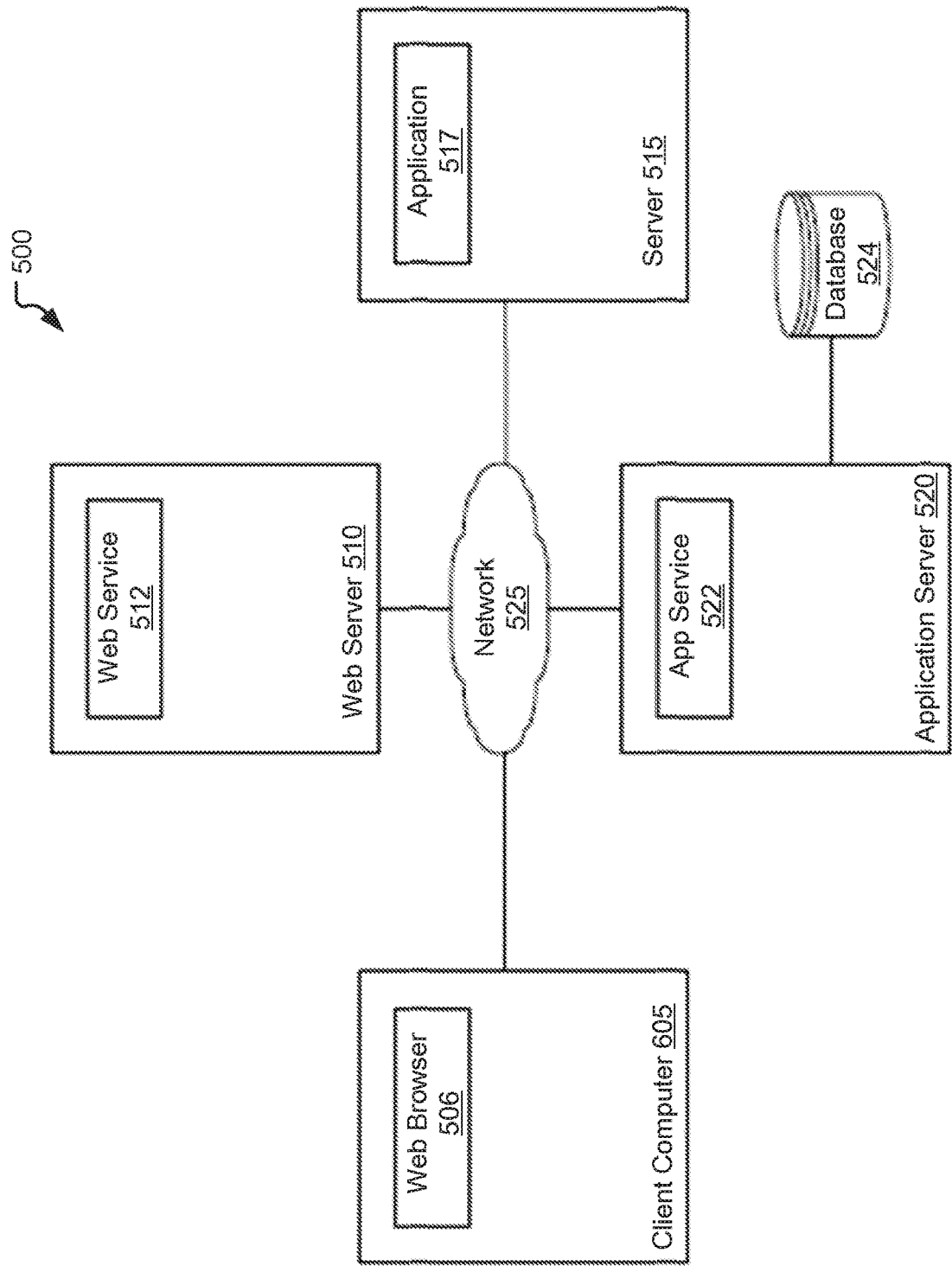
FIG. 5 illustrates another example computing system according to one embodiment, such as may be realized using a networked environment.

FIG. 5 illustrates another example computing system according to one embodiment, such as may be realized using a networked environment. As shown, the computing environment 500 includes a client computer 505, a web server 510, a server 515, and an application server 520. The client computer 505 may be a physical system (e.g., a desktop, laptop computer, mobile device, etc.) or a virtual computing instance executing in the cloud. The client computer 505 includes a web browser 507. A user may access data services through the web browser 507 over a network 525 (e.g., the Internet).

For instance, a user may access a web service 512 executing on a web server 510. In one embodiment, the web service 512 provides a web interface for an application server 520 (e.g., executing an application service 522). More specifically, the application service 522 provides a database 524. The database 524 may include data presented to users on the web browser 507.

Figure 6:
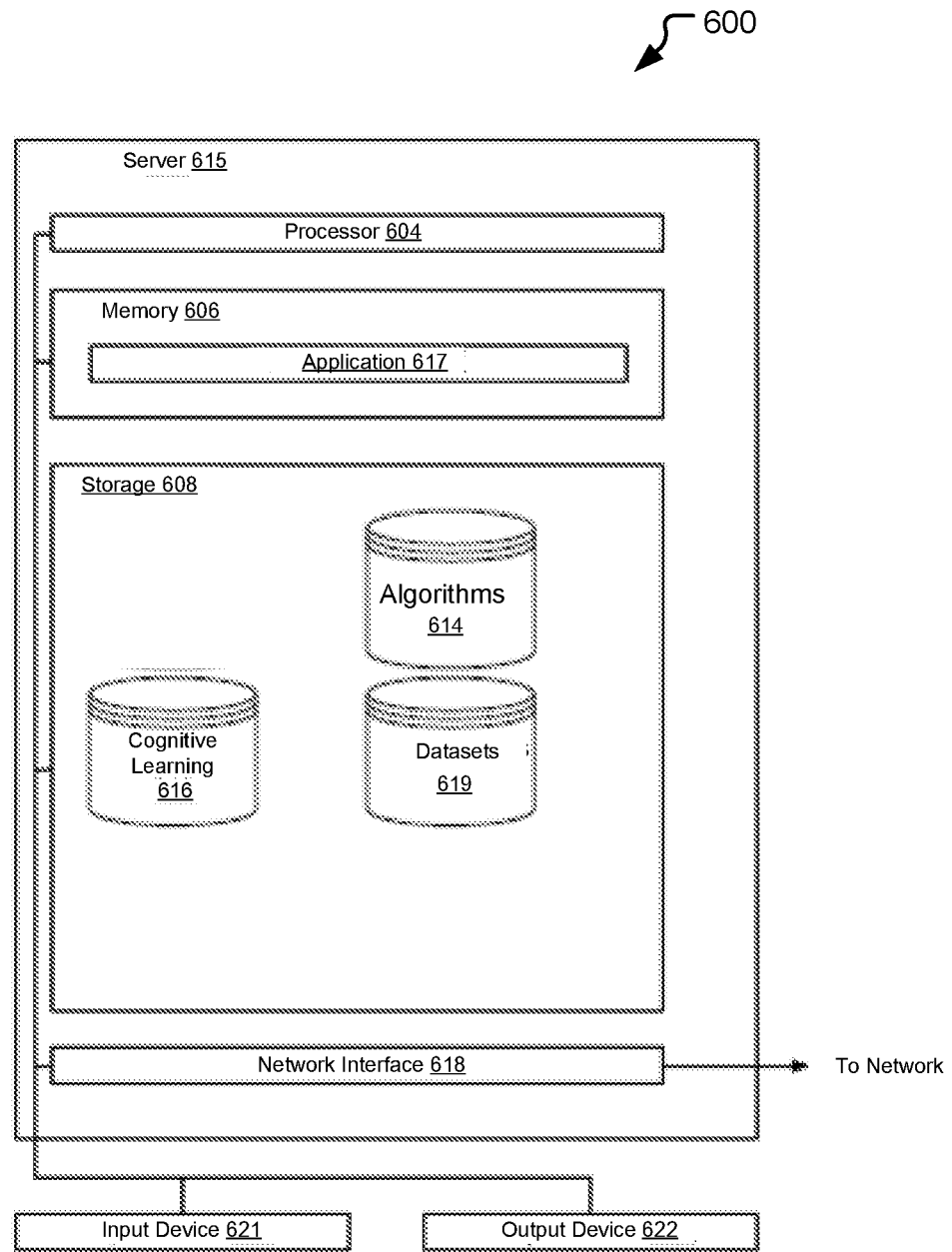
FIG. 6 further illustrates a server, such as the server of FIG. 5, according to one embodiment.

FIG. 6 further illustrates a server 615, such as the server 515 of FIG. 5, according to one embodiment. The server 615 generally includes a processor 604 connected via a bus to a memory 606, a network interface device 618, a storage 608, an input device 621, and an output device 624. The server 615 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 610 to communicate with other computers via the network 625.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems.

As shown, the memory 606 contains the application 617, which may be an application generally executed to take actions described herein. Storage 608 contains the algorithms 614, cognitive learning 616, and datasets 619.

The input device 621 may provide a keyboard and/or a mouse, etc. The output device 624 may be any conventional display screen. Although shown separately from the input device 621, the output device 624 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., threshold adjustment algorithms) or related data available in the cloud. For example, the modules of FIG. 1 could execute on a computing system in the cloud and. In such a case, the threshold adjustment algorithms could adjust response thresholds and store the new values at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof. While certain embodiments are applicable to spoken language systems, the claims are not limited or even particularly applicable to spoken language interfaces. In one example, an embodiment of a method may not relate to speech modality. The scope thereof is thus determined by the claims that follow.

What is claimed is:

1. An apparatus to improve a quality of responses from an automatic dialogue system by dynamically adjusting confidence and disambiguation thresholds, the apparatus comprising:
   one or more computer processors;
   an interface to receive a dialogue of the user during an interaction between the user and the automatic dialogue system, wherein the interaction is initiated by the user;
   a memory containing one or more modules executable by the one or more computer processors, the one or more modules comprising:
      a classifier module to infer, based on the dialogue, an objective of the user in initiating the interaction and determine a confidence score representing a measure of confidence that the inferred objective accurately reflects an actual objective of the user in initiating the interaction;
      a threshold evaluation module to determine whether the confidence score meets confidence and disambiguation thresholds for the objective inferred based on the dialogue, wherein the disambiguation threshold is lower than the confidence threshold;
      an inference module to, upon a determination that the confidence score does not meet the confidence threshold but meets the disambiguation threshold, prompt the user to confirm that the inferred objective accurately reflects the actual objective; and
      a threshold modification module to, upon receipt of confirmation that the inferred objective accurately reflects the actual objective, decrease each of the confidence and disambiguation thresholds while maintaining a same measure of difference between the confidence and disambiguation thresholds, wherein a response is determined based on the inferred objective and output.

2. The apparatus of claim 1, wherein at least one of the confidence and disambiguation thresholds is adjusted by a preset amount according to a programmable threshold adjustment policy.

3. A computer-implemented method of improving a quality of responses from an automatic dialogue system by dynamically adjusting confidence and disambiguation thresholds, the computer-implemented method comprising:
   receiving a dialogue of the user during an interaction between the user and the automatic dialogue system, wherein the interaction is initiated by the user;
   inferring, based on the dialogue and by operation of one or more computer processors, an objective of the user in initiating the interaction;
   determining a confidence score representing a measure of confidence that the inferred objective accurately reflects an actual objective of the user in initiating the interaction;
   upon determining that the confidence score does not meet a confidence threshold for the objective inferred based on the dialogue but meets a disambiguation threshold for the objective inferred based on the dialogue, prompting the user to confirm that the inferred objective accurately reflects the actual objective, wherein the disambiguation threshold is lower than the confidence threshold;
   upon receiving confirmation that the inferred objective accurately reflects the actual objective, decreasing each of the confidence and disambiguation thresholds while maintaining a same measure of difference between the confidence and disambiguation thresholds; and
   determining a response based on the inferred objective, wherein the response is output.

4. The computer-implemented method of claim 3, further comprising presetting at least one of the confidence and disambiguation thresholds.

5. The computer-implemented method of claim 3, wherein at least one of the confidence and disambiguation thresholds is adjusted by a preset amount according to a programmable threshold adjustment policy.

6. The computer-implemented method of claim 3, wherein at least one of the confidence and disambiguation thresholds is adjusted according a number of times that the at least one of the confidence and disambiguation thresholds has already been adjusted.

7. A computer program product to improve a quality of responses from an automatic dialogue system by dynamically adjusting confidence and disambiguation thresholds, the computer program product comprising:
   a computer readable storage medium having computer-readable program code embodied therewith, the computer-readable program code executable by one or more computer processors to:
      receive a dialogue of the user during an interaction between the user and the automatic dialogue system, wherein the interaction is initiated by the user;
      infer, based on the dialogue, an objective of the user in initiating the interaction;
      determine a confidence score representing a measure of confidence that the inferred objective accurately reflects an actual objective of the user in initiating the interaction;
      upon determining that the confidence score does not meet a confidence threshold for the objective inferred based on the dialogue but meets a disambiguation threshold for the objective inferred based on the dialogue, prompt the user to confirm that the inferred objective accurately reflects the actual objective wherein the disambiguation threshold is lower than the confidence threshold;
      upon receiving confirmation that the inferred objective accurately reflects the actual objective, decrease each of the confidence and disambiguation thresholds while maintaining a same measure of difference between the confidence and disambiguation thresholds; and
      determining a response based on the inferred objective, wherein the response is output.

8. The computer-implemented of claim 3, wherein the automatic dialogue system is configured to, upon receiving confirmation that the inferred objective does not accurately reflect the actual objective, increase the disambiguation threshold without adjusting the confidence threshold.

9. The computer-implemented method of claim 8, wherein the automatic dialogue system is configured to, upon receiving confirmation that the inferred objective does not accurately reflect the actual objective despite the confidence score having met the confidence threshold, increase each of the confirmation and disambiguation thresholds.

10. The computer-implemented method of claim 9, wherein increasing and decreasing each of the confidence and disambiguation thresholds comprises increasing and decreasing the respective threshold by a weighted difference, respectively, wherein the weighted difference comprises a difference between the confidence score and the respective threshold, weighted by a proportion of inaccurately inferred objectives in the past to total inferred objectives in the past.

11. The computer-implemented method of claim 10, wherein the confidence threshold, when met, causes acceptance of the inferred objective without prompting for confirmation, wherein the disambiguation threshold, when not met, causes rejection of the inferred objective without prompting for confirmation and further causes a clarified dialogue to be requested.

12. The apparatus of claim 1, wherein the threshold evaluation module is configured to preset at least one of the confidence and disambiguation thresholds.

13. The apparatus of claim 1, wherein at least one of the confidence and disambiguation thresholds is adjusted according a number of times that the at least one of the confidence and disambiguation thresholds has already been adjusted.

14. The computer program product of claim 7, wherein the computer-readable program code is further executable to preset at least one of the confidence and disambiguation thresholds.

15. The computer program product of claim 7, wherein at least one of the confidence and disambiguation thresholds is adjusted by a preset amount according to a programmable threshold adjustment policy.

16. The computer program product of claim 7, wherein at least one of the confidence and disambiguation thresholds is adjusted according a number of times that the at least one of the confidence and disambiguation thresholds has already been adjusted.

17. The apparatus of claim 1, wherein the confidence threshold, when met, causes acceptance of the inferred objective without prompting for confirmation, wherein the disambiguation threshold, when not met, causes rejection of the inferred objective without prompting for confirmation and further causes a clarified dialogue to be requested.

18. The computer-implemented of claim 3, wherein the confidence threshold, when met, causes acceptance of the inferred objective without prompting for confirmation, wherein the disambiguation threshold, when not met, causes rejection of the inferred objective without prompting for confirmation and further causes a clarified dialogue to be requested.

19. The computer program product of claim 7, wherein the confidence threshold, when met, causes acceptance of the inferred objective without prompting for confirmation, wherein the disambiguation threshold, when not met, causes rejection of the inferred objective without prompting for confirmation and further causes a clarified dialogue to be requested.

* * * * *